United States Patent
Inoue

(10) Patent No.: US 10,496,902 B2
(45) Date of Patent: Dec. 3, 2019

(54) DATA AUGMENTATION FOR IMAGE CLASSIFICATION TASKS

(71) Applicant: INTERNATIONAL BUSINESS MACHINES CORPORATION, Armonk, NY (US)

(72) Inventor: Hiroshi Inoue, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 15/711,756

(22) Filed: Sep. 21, 2017

(65) Prior Publication Data

US 2019/0087694 A1 Mar. 21, 2019

(51) Int. Cl.
*G06N 3/08* (2006.01)
*G06K 9/62* (2006.01)
(Continued)

(52) U.S. Cl.
CPC ....... *G06K 9/6278* (2013.01); *G06K 9/00718* (2013.01); *G06N 3/08* (2013.01);
(Continued)

(58) Field of Classification Search
CPC ............. G06K 9/6278; G06K 9/00718; G06K 9/6296; G06N 3/08; G06N 20/00;
(Continued)

(56) References Cited

U.S. PATENT DOCUMENTS

| 8,416,847 B2 * | 4/2013 | Roman ................. H04N 19/70 375/240 |
| 9,536,293 B2 | 1/2017 | Lin et al. |

(Continued)

FOREIGN PATENT DOCUMENTS

| CN | 103310229 | 9/2013 |
| CN | 106169081 | 11/2016 |

(Continued)

OTHER PUBLICATIONS

Fawzi, et al., "Adaptive Data Augmentation for Image Classification", EPFL, May 2016, 5 pages.

(Continued)

*Primary Examiner* — Sheela C Chawan
(74) *Attorney, Agent, or Firm* — Tutunjian & Bitetto, P.C.; Vazken Alexanian

(57) ABSTRACT

A computer-implemented method and systems are provided for performing machine learning for an image classification task. The method includes selecting, by a processor operatively coupled to one or more databases, a first and a second image from one or more training sets in the one or more databases. The method further includes overlaying, by the processor, the second image on the first image to form a mixed image, by averaging an intensity of each of a plurality of co-located pixel pairs in the first and the second image. The method also includes training, by the processor, a machine learning process configured for the image classification task using the mixed image to augment data used by the machine learning process for the image classification task.

12 Claims, 9 Drawing Sheets

(51) Int. Cl.
   *G06K 9/00* (2006.01)
   *G06N 20/00* (2019.01)
(52) U.S. Cl.
   CPC ........... *G06K 9/6296* (2013.01); *G06N 20/00* (2019.01); *G06T 2207/20076* (2013.01); *G06T 2207/20081* (2013.01)
(58) Field of Classification Search
   CPC . G06T 2207/20081; G06T 2207/20084; G06T 2207/20076
   USPC ....... 382/128, 151, 155, 156, 190, 195, 224; 434/20, 22, 44, 12, 11, 43, 21
   See application file for complete search history.

(56) References Cited

U.S. PATENT DOCUMENTS

| | | | |
|---|---|---|---|
| 9,864,931 B2* | 1/2018 | Kumar | G06K 9/6245 |
| 10,176,642 B2* | 1/2019 | Tran | G06T 19/006 |
| 10,213,692 B2* | 2/2019 | Velic | G06K 9/00201 |
| 2016/0140425 A1 | 5/2016 | Kulkarni et al. | |
| 2016/0140438 A1 | 5/2016 | Yang et al. | |
| 2017/0116744 A1 | 4/2017 | Abedini et al. | |
| 2017/0140253 A1 | 5/2017 | Wshah et al. | |
| 2017/0200092 A1 | 7/2017 | Kisilev | |

FOREIGN PATENT DOCUMENTS

| | | | |
|---|---|---|---|
| CN | 106296623 | | 1/2017 |
| CN | 1062296623 | * | 4/2017 |

OTHER PUBLICATIONS

Gao, et al., "HEp-2 Cell Image Classification with Deep Convolutional Neural Networks", Elsevier, May 2015, pp. 1-32.

Krizhevsky, et al., ImageNet Classification with Deep Convolutional Neural Networks, NIPS'12 Proceedings of the 25th International Conference on Neural Information Processing Systems, Dec. 2012, 9 pages.

Simard, et al., "Best Practices for Convolutional Neural Networks Applied to Visual Document Analysis", Proceedings of the Seventh International Conference on Document Analysis and Recognition (ICDAR 2003), Aug. 2003, 6 pages.

Wang et al., "The Effectiveness of Data Augmentation in Image Classification using Deep Learning", cs231n.stanford.edu, 8 pages.

Wu et al., "Deep Image: Scaling up Image Recognition", arxiv.org, Jan. 2015, 12 pages.

International Search Report dated Jan. 3, 2019 for International Application No. PCT/IB2018/057257, 9 pages.

\* cited by examiner

DATA AUGMENTATION FOR IMAGE CLASSIFICATION TASKS

BACKGROUND

Technical Field

The present invention relates generally to information processing and, in particular, to data augmentation for image classification tasks.

Description of the Related Art

Data augmentation is a technique used in certain applications. In general, data augmentation involves applying a small mutation to training images for better generalization performance by avoiding overfitting.

However, the use of data augmentation is not without deficiency. For example, conventional data augmentation techniques suffer from a lack of high accuracy as well as unduly prolonged training time for image classification tasks. Accordingly, there is a need for an improved data augmentation technique for image classification tasks.

SUMMARY

According to an aspect of the present invention, a computer-implemented method is provided for performing machine learning for an image classification task. The method includes selecting, by a processor operatively coupled to one or more databases, a first and a second image from one or more training sets in the one or more databases. The method further includes overlaying, by the processor, the second image on the first image to form a mixed image, by averaging an intensity of each of a plurality of co-located pixel pairs in the first and the second image. The method also includes training, by the processor, a machine learning process configured for the image classification task using the mixed image to augment data used by the machine learning process for the image classification task.

According to another aspect of the present invention, a computer program product is provided for performing machine learning for an image classification task. The computer program product includes a non-transitory computer readable storage medium having program instructions embodied therewith. The program instructions are executable by a computer to cause the computer to perform a method. The method includes selecting, by a processor operatively coupled to one or more databases, a first and a second image from one or more training sets in the one or more databases. The method further includes overlaying, by the processor, the second image on the first image to form a mixed image, by averaging an intensity of each of a plurality of co-located pixel pairs in the first and the second image. The method also includes training, by the processor, a machine learning process configured for the image classification task using the mixed image to augment data used by the machine learning process for the image classification task.

According to yet another aspect of the present invention, a computer processing system is provided for performing machine learning for an image classification task. The computer processing system includes a processor that is operatively coupled to one or more databases. The processor is configured to select a first and a second image from one or more training sets in the one or more databases. The processor is further configured to overlay the second image on the first image to form a mixed image, by averaging an intensity of each of a plurality of co-located pixel pairs in the first and the second image. The processor is also configured to train a machine learning process for the image classification task using the mixed image to augment data used by the machine learning process for the image classification task.

According to still another aspect of the present invention, an advanced driver-assistance system is provided for a motor vehicle. The advanced driver-assistance system includes a camera configured to capture an actual image relating to an external view from the motor vehicle. The advanced driver-assistance system further includes a processor that is operatively coupled to one or more databases. The processor is configured to select a first and a second image from one or more training sets in the one or more databases. The processor is further configured to overlay the second image on the first image to form a mixed image, by averaging an intensity of each of a plurality of co-located pixel pairs in the first and the second image. The processor is also configured to perform machine learning by training a machine learning process configured for an image classification task using the mixed image to augment data used by the machine learning process for the image classification task. The image classification task relates to a driver-assistance function. The processor is additionally configured to apply the trained machine learning process to the test image to obtain a classification for the test image. The processor is also configured to control a function of one or more hardware devices of the motor vehicle, responsive to the classification for the test image.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to data augmentation for image classification tasks.

In an embodiment, the present invention can achieve a higher accuracy in image classification tasks with a Neural Network (NN) by introducing a new data augmentation technique. It is to be appreciated that the present invention is not limited to neural networks and can be used with any learning mechanism/technique, as readily appreciated by one of ordinary skill in the art given the teachings of the present invention provided herein. The present invention is not limited to any particular type of neural network and, thus, can be used with neural network such as Convolutional Neural Networks, Recurrent Neural Networks (RNNs), and so forth. Moreover, the present invention can also be applied to non-NN based learning mechanisms/techniques including, but not limited to, Inductive Logic Programming (ILP), decision trees, and so forth. These and other learning mechanisms/techniques to which the present invention can be applied are readily determined by one of ordinary skill in the art, while maintaining the spirit of the present invention.

Data augmentation in accordance with the present invention can involve any mutation applied to the training images. For example, data augmentation in accordance with the present invention can involve, but is not limited to, overlaying noise, distorting, extraction, rotation, translation, rescaling, shearing, stretching, and flipping for each input image.

Figure 1:
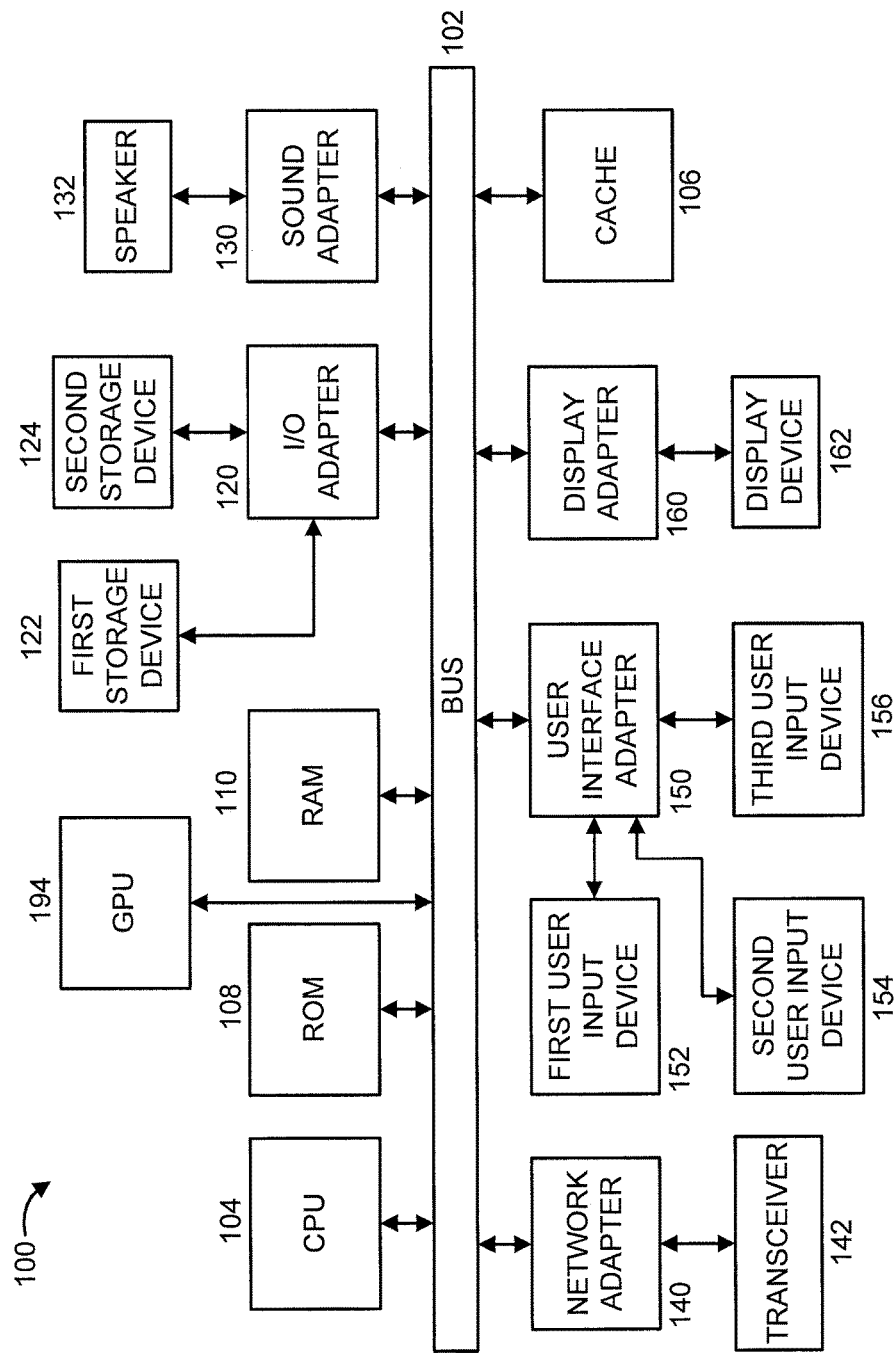
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. At least one Graphics Processing Unit (GPU) 194 is operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
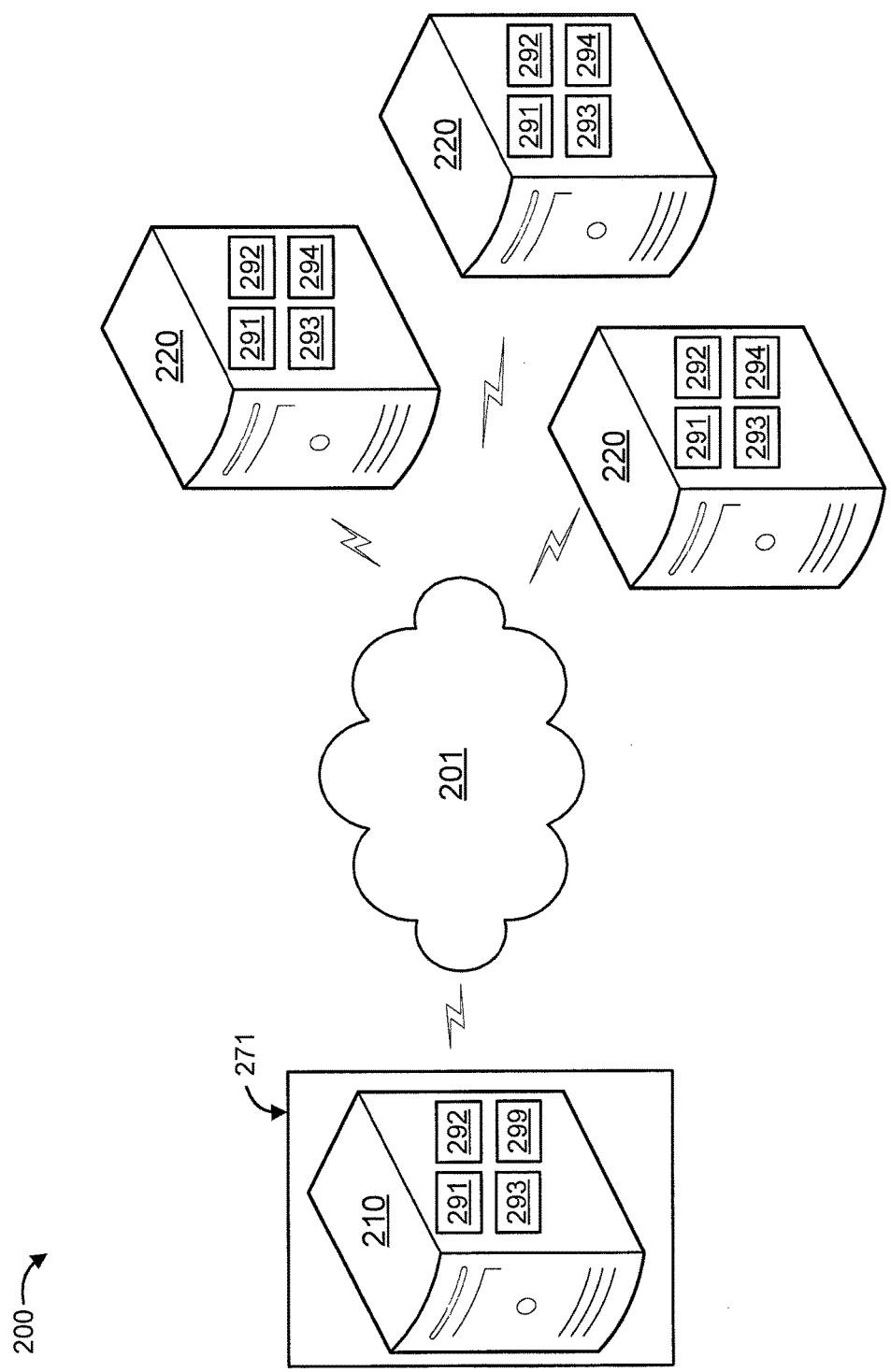
FIG. 2 shows an exemplary system to which the present invention can be applied, in accordance with an embodiment of the present invention.

Moreover, it is to be appreciated that system 200 described below with respect to FIG. 2 is a system for implementing respective embodiments of the present invention. Part or all of processing system 100 may be implemented in one or more of the elements of system 200.

Figure 3:
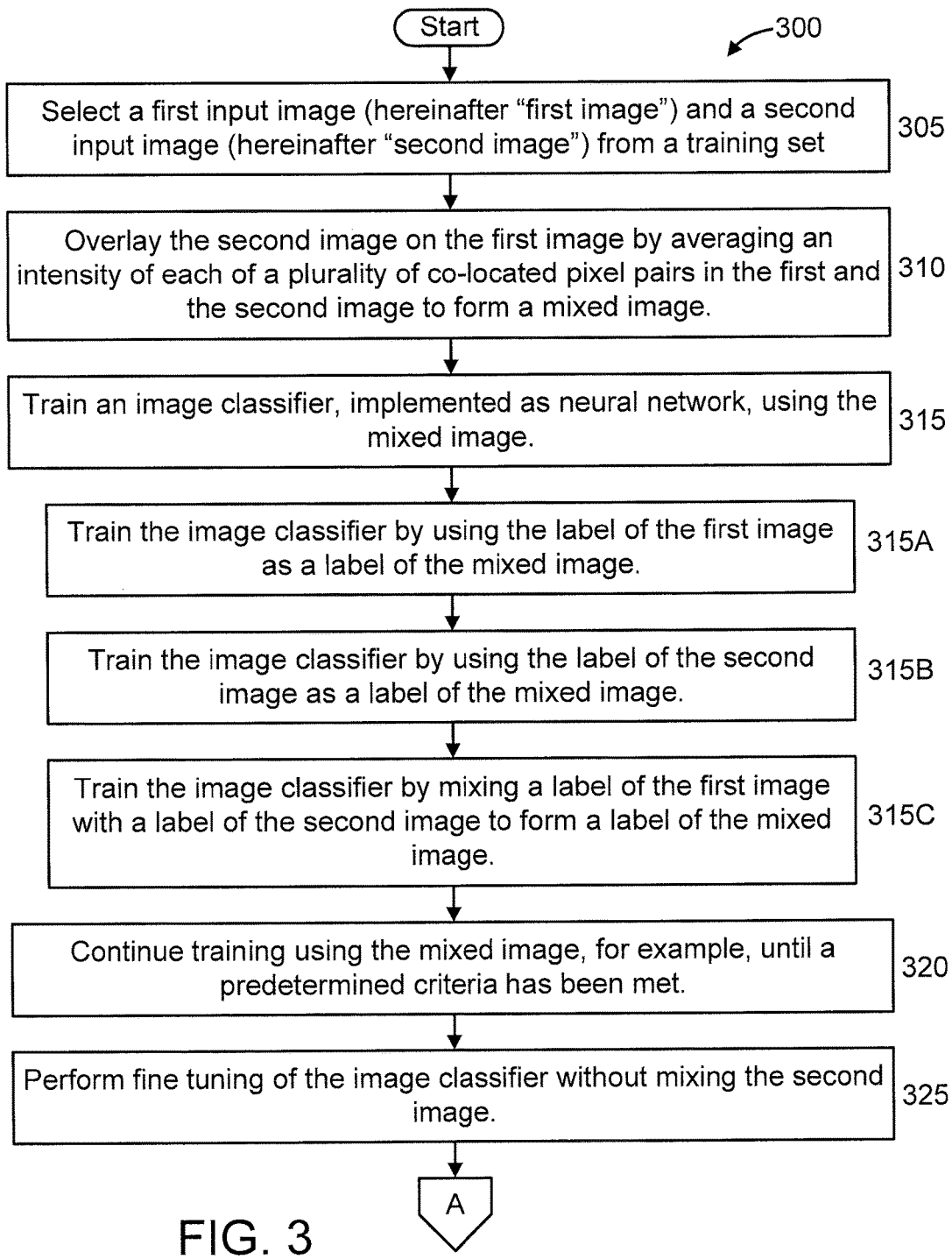
FIGS. 3-4 show an exemplary method for data augmentation for image classification tasks, in accordance with an embodiment of the present invention.
Figure 4:
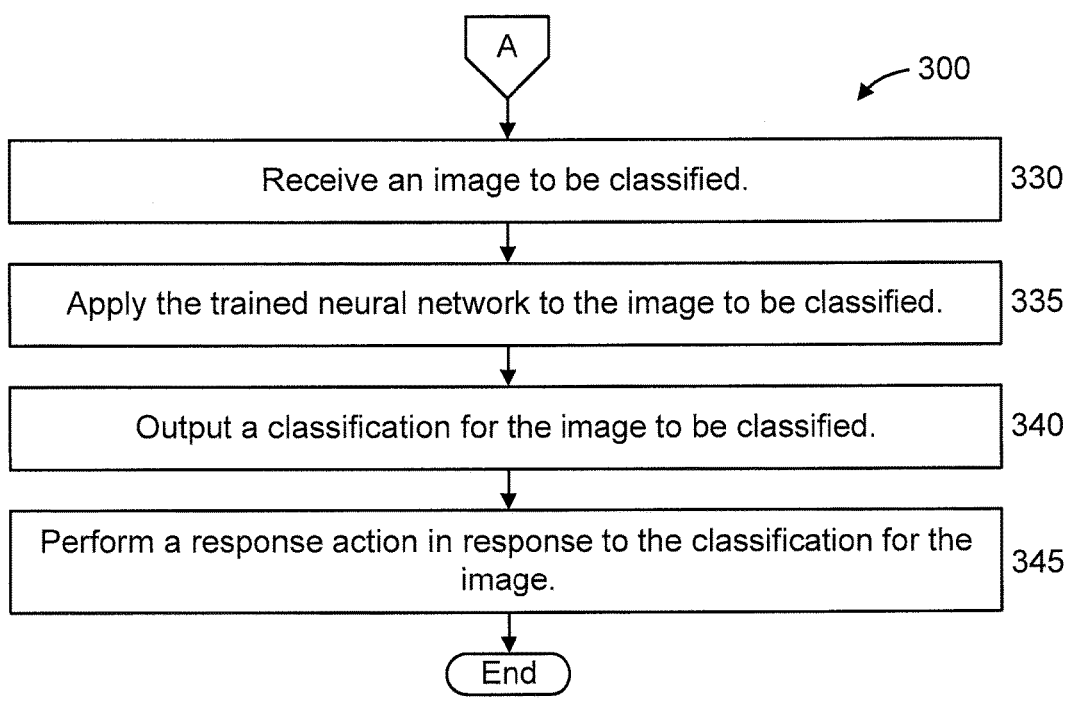
Figure 5:
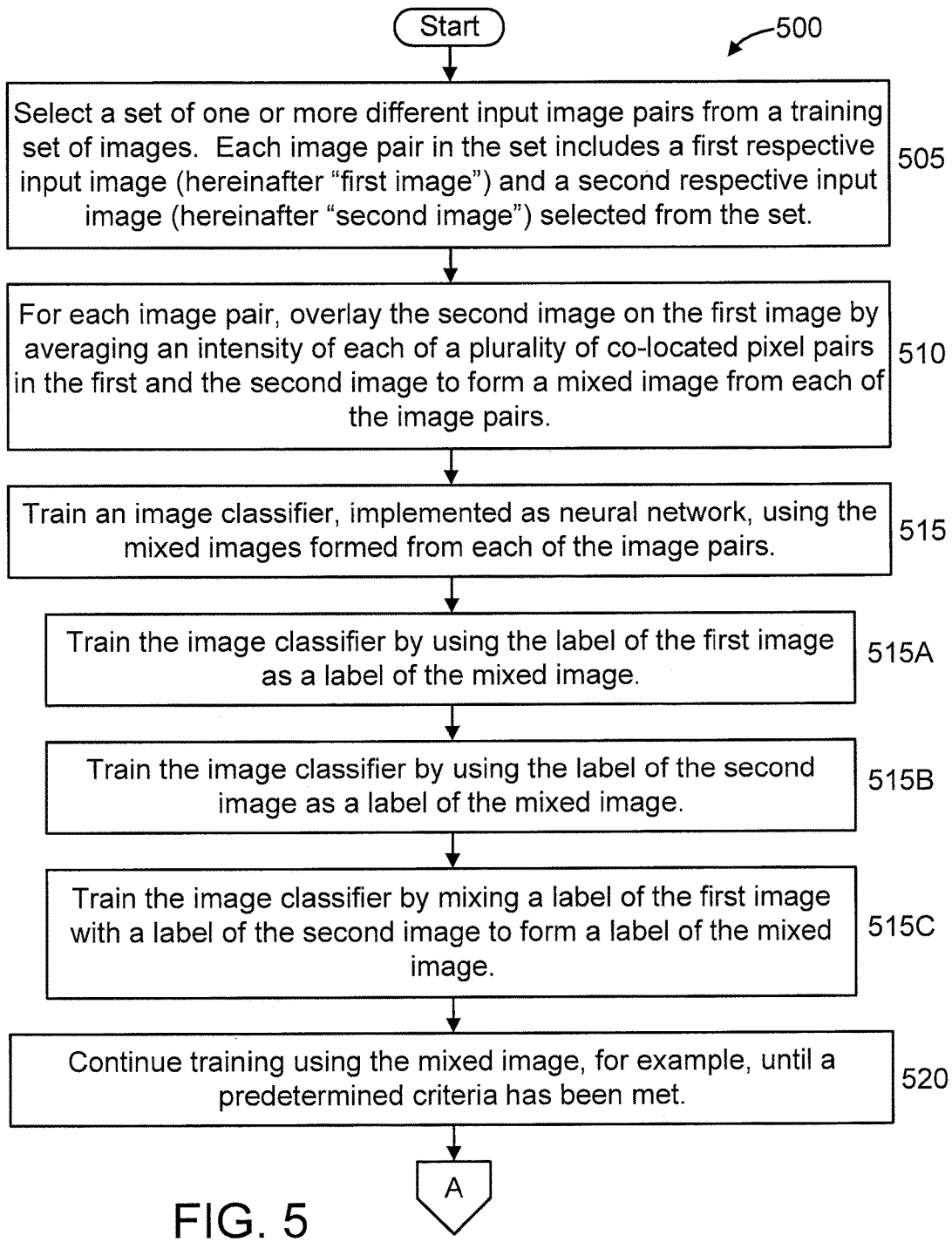
FIGS. 5-6 show another exemplary method for data augmentation for image classification tasks, in accordance with an embodiment of the present invention.
Figure 6:
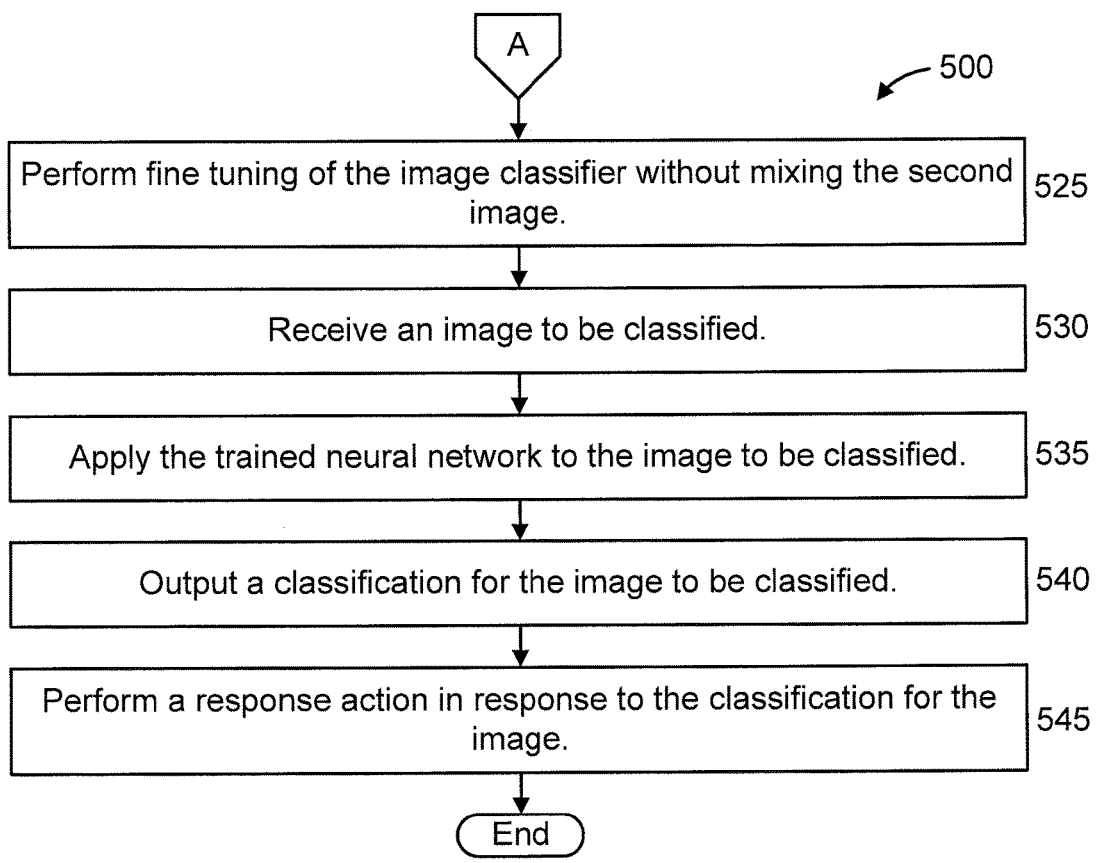
Figure 7:
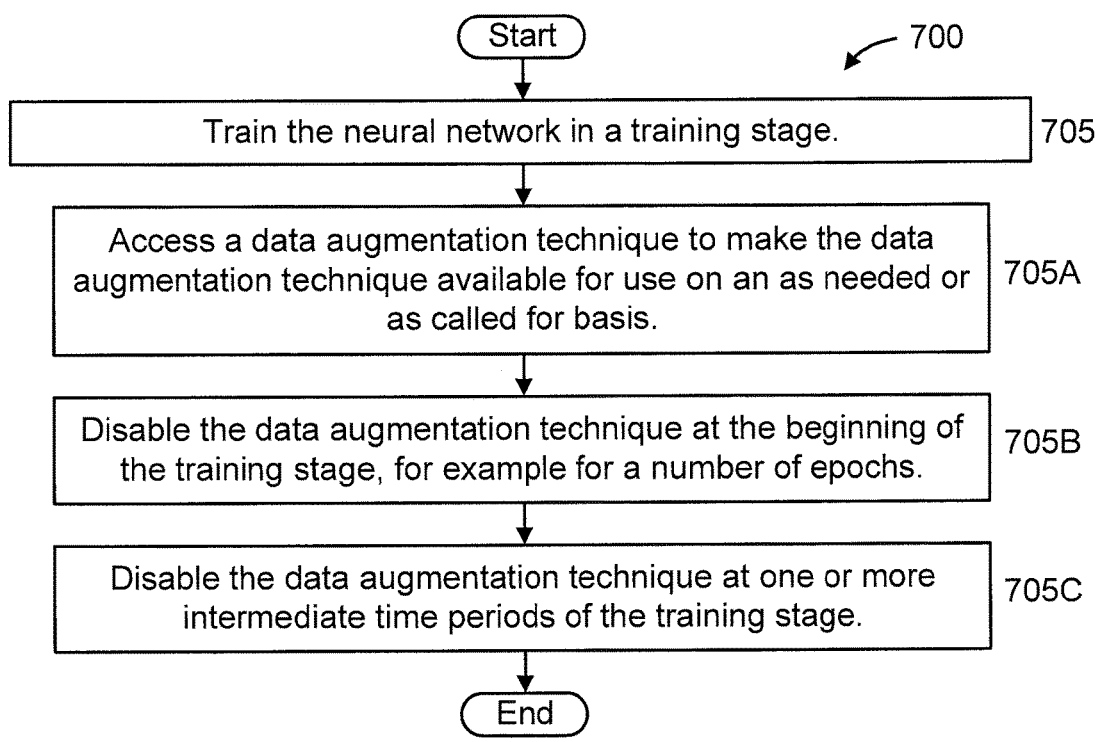
FIG. 7 shows an overall neural network training scheme to which the present invention can be applied, in accordance with an embodiment of the present invention.

Further, it is to be appreciated that processing system 100 may perform at least part of the method described herein including, for example, at least part of method 300 of FIGS. 3-4 and/or at least part of method 500 of FIGS. 5-6 and/or at least part of method 700 of FIG. 7. Similarly, part or all of system 200 may be used to perform at least part of method 300 of FIGS. 3-4 and/or at least part of method 500 of FIGS. 5-6 and/or at least part of method 700 of FIG. 7.

FIG. 2 shows an exemplary system 200 to which the present invention can be applied, in accordance with an embodiment of the present invention. The system 200 includes a computer processing system 210 (e.g., computer processing system 100) and a set of other computer processing systems 220. In an embodiment, one or more of the computer processing systems 210 and 220 can be configured as servers.

The computer processing system 210 can be configured to receive images from any of the other computer processing systems 220. The computer processing system 210 can subject the received images to a data augmentation technique for image classification tasks in accordance with the present invention. The results of the data augmentation technique can then be provided from the computer processing system 210 to one or more of the other computer processing systems 220. In this way, a more accurate image classification as compared to the prior art can be achieved in accordance with the teachings of the present invention.

Each of the computer processing system 210 and the other computer processing systems 220 at least include a processor 291, a memory 292, and a transceiver 293. Also, at least one of the computer processing systems such as 210 can include a camera 299 for capturing an actual image to which a trained neural network can be applied. Moreover, at least the other computer processing systems 220 further include a database 294 for storing all or a portion of one or more training (image) sets. The transceiver 293 of the other computer processing systems 220 send the images to the transceiver 293 of the computer processing system 210. The processor 291 and memory 292 of the computer processing system 210 then processing the images to provide an image classification result to one or more of the other computer processing systems 220 via the transceivers 293.

In an embodiment, computer processing system 210 can be part of another system 271. Such other system can be, for example, but is not limited to, a surveillance system, a computer vision system, an action recognition system, an Advanced Driver-Assistance System, and so forth. It is to be appreciated that the preceding types of systems are merely illustrative and the present invention can be applied to a myriad of different types of systems that can benefit from image classification. Other elements in these systems are not shown in FIG. 2 for the sake of brevity and clarity, but are nonetheless readily known and appreciated by one of ordinary skill in the art.

In the embodiment shown in FIG. 2, the elements thereof are interconnected by a network(s) 201. However, in other embodiments, other types of connections can also be used. Moreover, in an embodiment, at least one of the elements of system 200 is processor-based (in the shown example, all are processor-based). Further, while one or more elements may be shown as separate elements, in other embodiments, these elements can be combined as one element. The converse is also applicable, where while one or more elements may be part of another element, in other embodiments, the one or more elements may be implemented as standalone elements. Moreover, one or more elements of FIG. 2 can be implemented in a cloud configuration including, for example, in a distributed configuration. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

Two exemplary methods 300 and 500 will now be described with respect to FIGS. 3-4 and 5-6. In particular, method 300 of FIGS. 3-4 corresponds to a data augmentation technique that is described using only two input images that form a single image pair for the sake of simplicity and illustration. In contrast, method 500 of FIGS. 5-6 corresponds to the data augmentation technique of FIG. 3 applied to a set of input image pairs that include more than one pair of input images. These and other variations and extensions of methods 300 and 500 are readily contemplated by one of ordinary skill in the art given the teachings of the present invention provided herein, while maintaining the spirit of the present invention. As mentioned above, any of system 100 and system 200 can be used to perform method 300 and/or method 500 (and/or method 700). To that end, it is to be appreciated that the method steps described herein can be performed by, e.g., a Central Processing Unit (CPU) (e.g., CPU 104 of FIG. 1) and/or by a Graphics Processing Unit (GPU) (GPU 194 of FIG. 1). It is to be further appreciated that while one or more of the methods 300, 500, and 700 refer to the use of neural networks, any type of machine learning process can be used in place thereof, as readily appreciated by one of ordinary skill in the art. For example, the present invention can be used with machine learning processes including, but not limited to, decision tree learning, association rule learning, deep learning, inductive programming logic, support vector machines, clustering, Bayesian networks, reinforcement learning, representation learning, similarity and metric learning, sparse dictionary learning, rule-based machine learning, and learning classification. The preceding machine learning processes to which the present invention can be applied are merely illustrative and, thus, the present invention can also be applied to other machine learning processes, while maintaining the spirit of the present invention.

FIGS. 3-4 show an exemplary method 300 for data augmentation for image classification tasks, in accordance with an embodiment of the present invention.

At step 305, select a first input image (hereinafter "first image") and a second input image (hereinafter "second image") from a training set.

At step 310, overlay the second image on the first image by averaging an intensity of each of a plurality of co-located pixel pairs in the first and the second image to form a mixed image.

At step 315, train an image classifier, implemented as neural network, using the mixed image.

In an embodiment, step 315 can include one or more of steps 315A-C.

At step 315A, train the image classifier by using the label of the first image as a label of the mixed image.

At step 315B, train the image classifier by using the label of the second image as a label of the mixed image.

At step 315C, train the image classifier by mixing a label of the first image with a label of the second image to form a label of the mixed image.

At step 320, continue training using the mixed image, for example, until a predetermined criteria has been met. The predetermined criteria can include, but is not limited to, for example, improvements in accuracy or training loss for training data or validation data. Thus, for example, training can be stopped when there is no further improvement in classification accuracy by performing further training.

At step 325, perform fine tuning of the image classifier without mixing the second image. That is, perform fine tuning using the unmixed images, i.e., the first image and the second image.

At step 330, receive an image to be classified.

At step 335, apply the trained neural network to the image to be classified.

At step 340, output a classification for the image to be classified.

At step 345, perform an action in response (hereinafter interchangeably referred to as "response action") to the classification for the image. The response action can be related to any number of applications to which the present invention can be applied including, but not limited to, surveillance, action recognition, an Advanced Driver-Assistance System, computer vision, and so forth. Accordingly, the action can be, for example, generating an audible reproduction of the classification (e.g., in the case of computer vision), generating a user-perceptible alert, locking a door to keep an object (e.g., a person or other animate object and/or an inanimate object) contained, unlocking a door to release a contained object, suggesting a correct action to a user (e.g., responsive to a classification indicating an incorrect action is being performed by the user, e.g., in a documented procedure and/or other process), taking control over one or more vehicle functions (e.g., braking, accelerating, steering), and so forth. The classification can correspond to a prohibited and/or dangerous item and/or so forth. It is to be appreciated that the preceding response actions are merely illustrative and, thus, any other response actions could also be performed responsive to a classification made by the present invention, while maintaining the spirit of the present invention.

FIGS. 5-6 show another exemplary method 500 for data augmentation for image classification tasks, in accordance with an embodiment of the present invention.

At step 505, select a set of one or more different input image pairs from a training set of images. Each of the image pairs in the set includes a first respective input image (hereinafter "first image") and a second respective input image (hereinafter "second image") selected from the set.

At step 510, for each image pair, overlay the second image on the first image by averaging an intensity of each of a plurality of co-located pixel pairs in the first and the second image to form a mixed image from each of the image pairs.

At step 515, train an image classifier, implemented as a neural network, using the mixed images formed from each of the image pairs.

In an embodiment, step 515 can include one or more of steps 515A-C.

At step 515A, train the image classifier by using the label of the first image as a label of the mixed image.

At step 515B, train the image classifier by using the label of the second image as a label of the mixed image.

At step 515C, train the image classifier by mixing a label of the first image with a label of the second image to form a label of the mixed image.

At step 520, continue training using the mixed images, for example, until a predetermined criteria has been met. The predetermined criteria can include, but is not limited to, for example, improvements in accuracy or training loss for training data or validation data. Thus, for example, training can be stopped when there is no further improvement in classification accuracy by performing further training.

At step 525, perform fine tuning of the image classifier without mixing the second images. That is, perform fine tuning using the unmixed images, i.e., the first images and the second images of the image pairs.

At step 530, receive an image to be classified.

At step 535, apply the trained neural network to the image to be classified.

At step 540, output a classification for the image to be classified.

At step 545, perform an action in response to the classification for the image. Possible exemplary actions are further described above with respect to step 345 of method 300.

FIG. 7 shows an overall neural network training scheme to which the present invention can be applied, in accordance with an embodiment of the present invention.

At step 705, train the neural network in a training stage.

In an embodiment, step 705 can include one or more of steps 705A-C.

At step 705A, access a data augmentation technique to make the data augmentation technique available for use on an as needed or as called for basis. The data augmentation technique can be any of method 300 of FIGS. 3-5 and method 500 of FIGS. 5-6.

At step 705B, disable the data augmentation technique at the beginning of the training stage, for example for a number of epochs. In this way, overall neural network training speed is increased and a better final accuracy can be obtained (as proven through numerous experiments).

At step 705C, disable the data augmentation technique at one or more intermediate time periods of the training stage. For example, the data augmentation technique can be disabled for a number of epochs. In this, similar to step 710B, overall neural network training speed is increased and a better final accuracy can be obtained.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
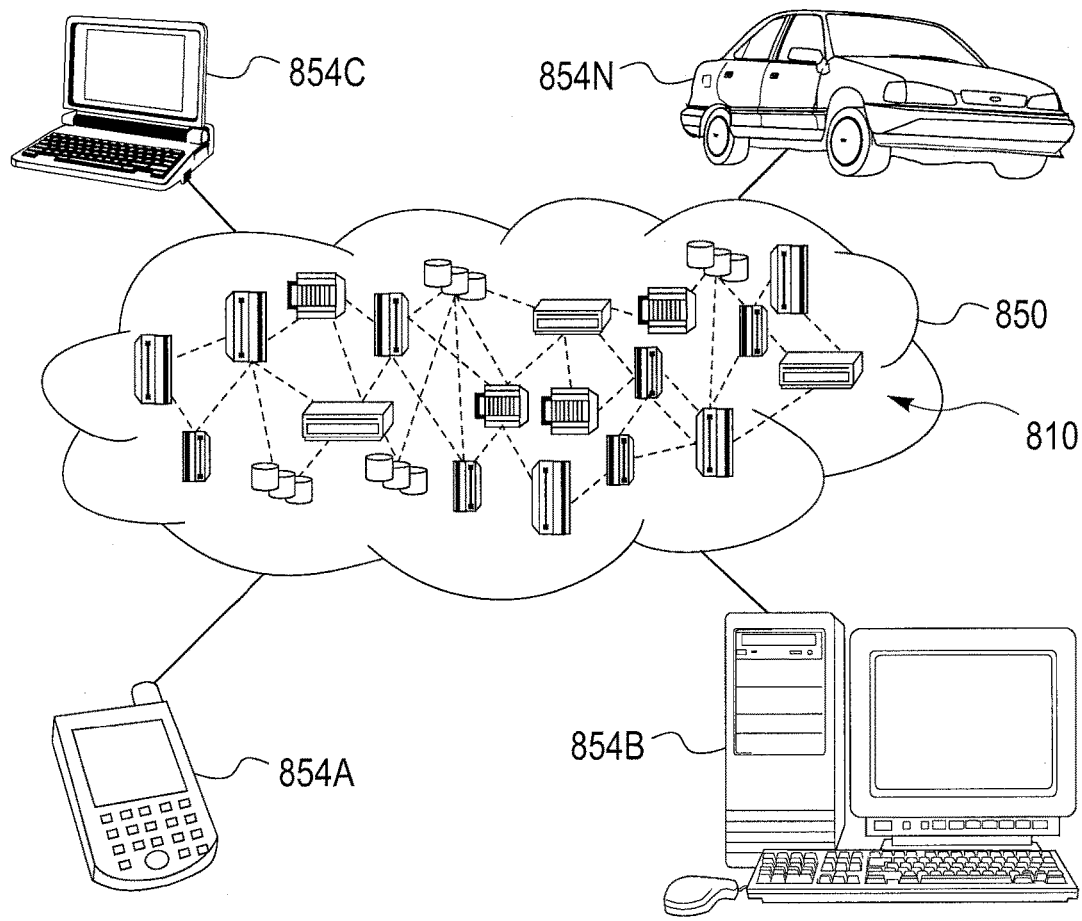
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
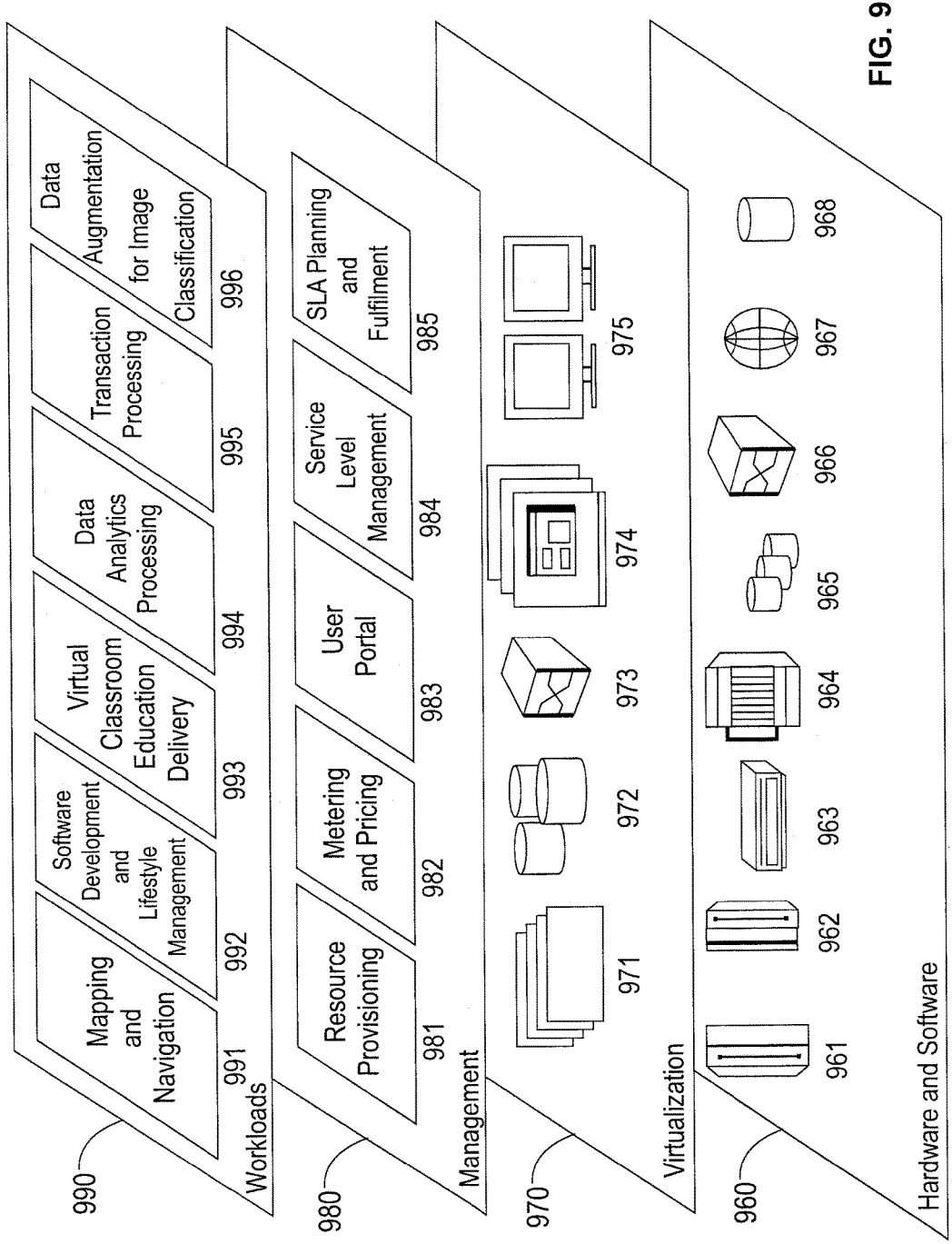
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and data augmentation for image classification tasks 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for performing machine learning for an image classification task, the method comprising:

selecting, by a processor operatively coupled to one or more databases, a first and a second image from one or more training sets in the one or more databases;

overlaying, by the processor, the second image on the first image to form a mixed image, by averaging an intensity of each of a plurality of co-located pixel pairs in the first and the second image; and training, by the processor, a machine learning process configured for the image classification task using the mixed image to augment data used by the machine learning process for the image classification task.

2. The computer-implemented method of claim 1, wherein said training step comprises using a label of the first image as a label of the mixed image.

3. The computer-implemented method of claim 1, wherein said training step comprises using a label of the second image as a label of the mixed image.

4. The computer-implemented method of claim 1, wherein said training step comprises mixing a label of the first image and a label of the second image to form a label of the mixed image.

5. The computer-implemented method of claim 1, wherein the selecting and overlaying steps are repeated for each of a plurality of different image pairs selected from the one or more training sets in the one or more databases to form a plurality of additional mixed images, and wherein the machine learning process is trained using the plurality of additional mixed images.

6. The computer-implemented method of claim 5, further comprising performing additional training without using any further mixed images to increase a training speed of the machine learning process.

7. The computer-implemented method of claim 5, wherein the additional training comprises a fine-tuning process for refining the machine learning process.

8. The computer-implemented method of claim 1, wherein said selecting and overlaying steps are part of a data augmentation process used for training the machine learning process in said training step, and wherein said data augmentation process is selectively disabled and enabled at one or more time periods to increase a training speed.

9. The computer-implemented method of claim 8, wherein the one or more time periods comprise multiple consecutive time periods, a first one of the multiple consecutive time periods corresponding to a commencement of a training stage for training the machine learning process.

10. The computer-implemented method of claim 8, wherein the one or more time periods are at intermediate periods in a training stage for training the machine learning process.

11. The computer-implemented method of claim 1, wherein the processor is a graphics processing unit.

12. The computer-implemented method of claim 1, wherein the image classification task relates to an advanced driver-assistance system and the method further comprises:

applying the trained machine learning process to a test image to obtain a classification for the test image; and controlling a function of one or more hardware devices of a motor vehicle, responsive to the classification for the test image.

* * * * *